United States Patent [19]
Fachini et al.

[11] 3,788,495
[45] Jan. 29, 1974

[54] AUTOMATIC BALE HANDLING DEVICE
[75] Inventors: Robert M. Fachini; Fenton L. Kenna, Jr.; Monroe C. Barrett; Louis E. Nickla, all of Memphis, Tenn.; Robert L. Graham, Houston, Tex.
[73] Assignee: International Harvester Company, Chicago, Ill.
[22] Filed: July 6, 1971
[21] Appl. No.: 159,902

[52] U.S. Cl................ 214/6 B, 214/6 P, 214/7, 214/518
[51] Int. Cl. ... B65g 57/28, B65g 57/32, B65g 57/22
[58] Field of Search.. 214/6 B, 6 G, 6 H, 6 P, 6 DK, 214/6 A, 7, 518–520

[56] References Cited
UNITED STATES PATENTS

| | | | |
|---|---|---|---|
| 3,367,518 | 2/1968 | Bishop | 214/6 B |
| 3,486,637 | 12/1969 | Hahn | 214/6 P |
| 2,883,074 | 4/1959 | Boehl et al. | 214/6 P |
| 3,007,585 | 11/1961 | Geisler | 214/6 H |
| 3,596,777 | 8/1971 | Neely, Jr. | 214/6 B |
| 3,497,085 | 2/1970 | Jay et al. | 214/6 B |
| 3,521,762 | 7/1970 | Walters | 214/6 B |
| 3,163,302 | 12/1964 | Pridgeon | 214/6 B |
| 3,402,832 | 9/1968 | Wehde | 214/6 B |
| 3,528,564 | 9/1970 | Fischer | 214/6 B |

FOREIGN PATENTS OR APPLICATIONS

| | | | |
|---|---|---|---|
| 1,444,118 | 5/1966 | France | 214/6 P |

Primary Examiner—Robert J. Spar
Attorney, Agent, or Firm—Neal C. Johnson; Floyd B. Harman

[57] ABSTRACT

A bale wagon for mechanically accumulating a load of bales arranged in a cross-tied pattern, and including an accumulator table, bale transfer assemblies, and a load carrying bed. The bale transfer assemblies operate to arrange selected layers of bales in distinct patterns to provide a cross-tied stack. The accumulator table is pivotally movable to deposit layers as vertical tiers onto the load carrying bed which, in turn, is pivotally movable to deposit a bale stack onto the ground.

14 Claims, 11 Drawing Figures

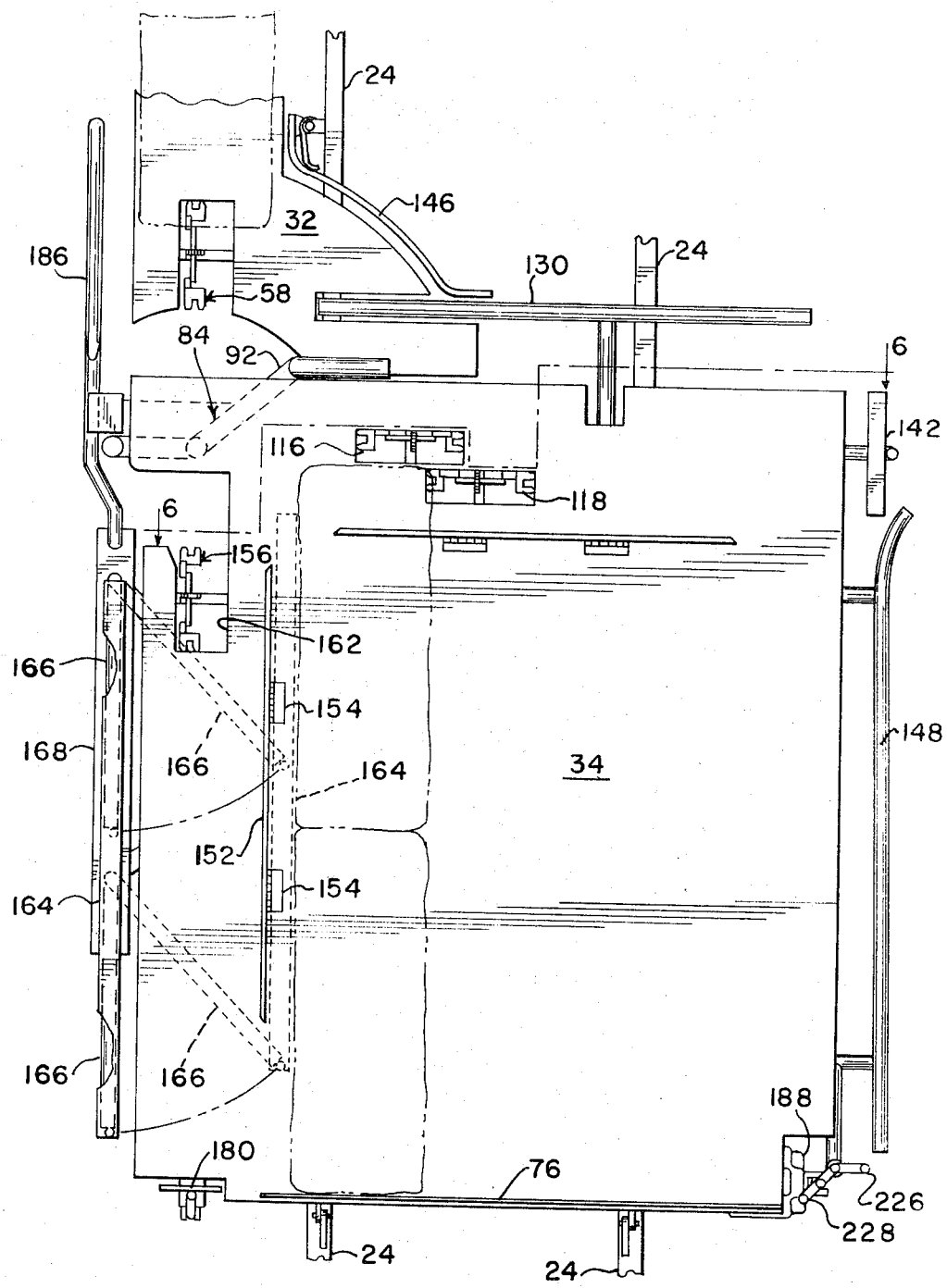

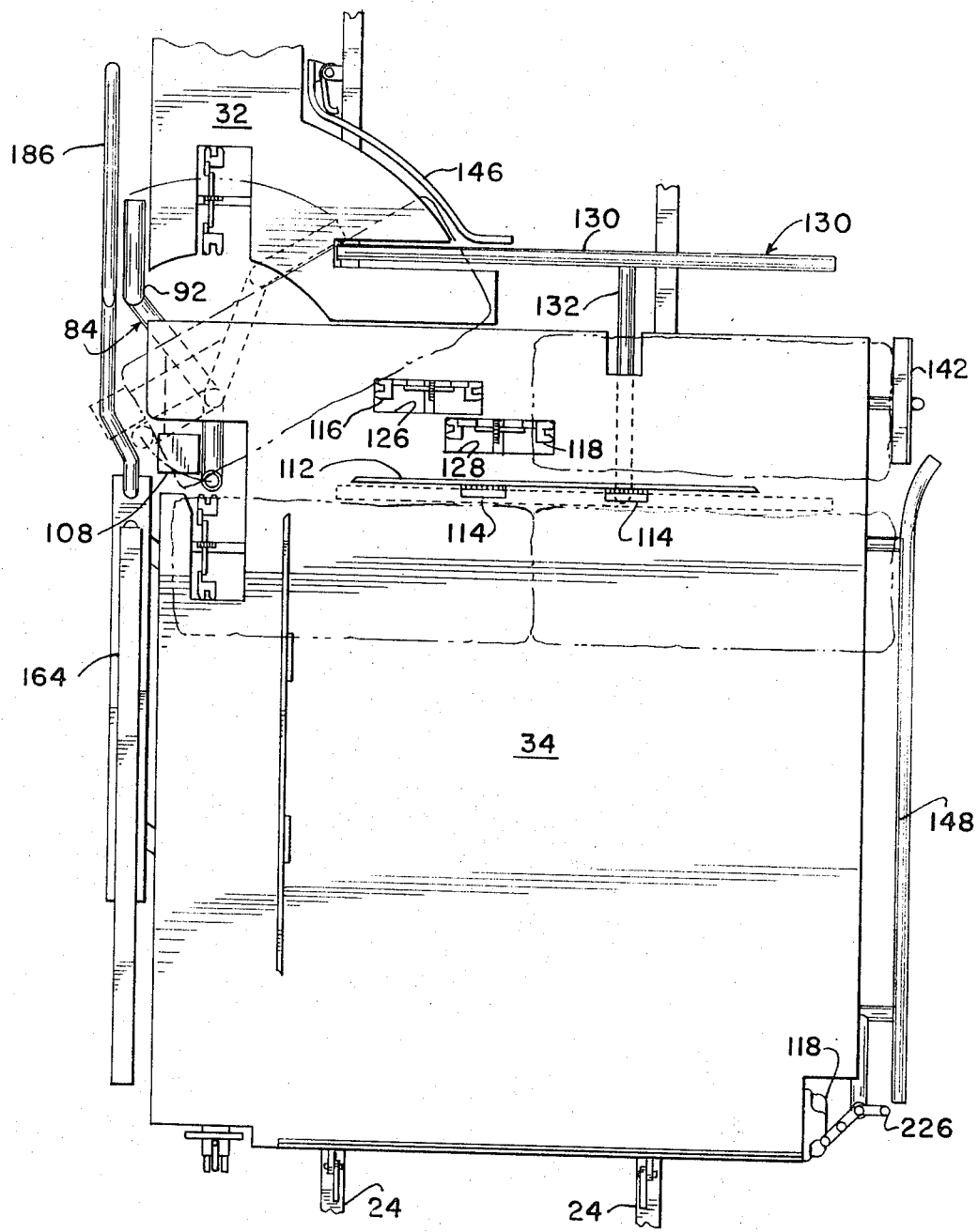

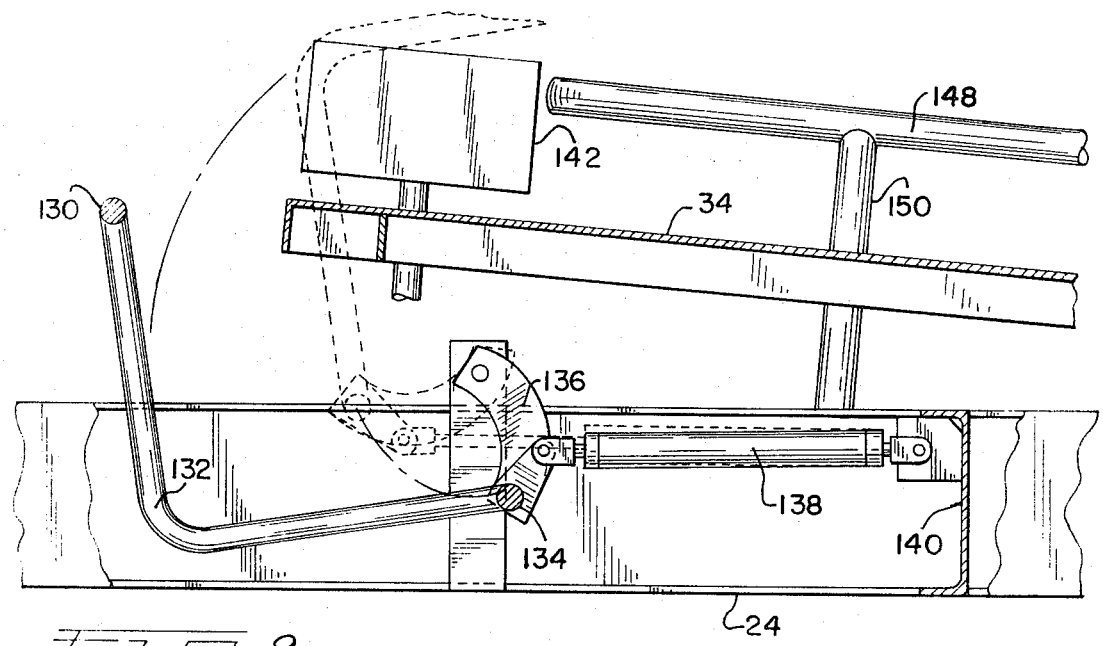
FIG_9_
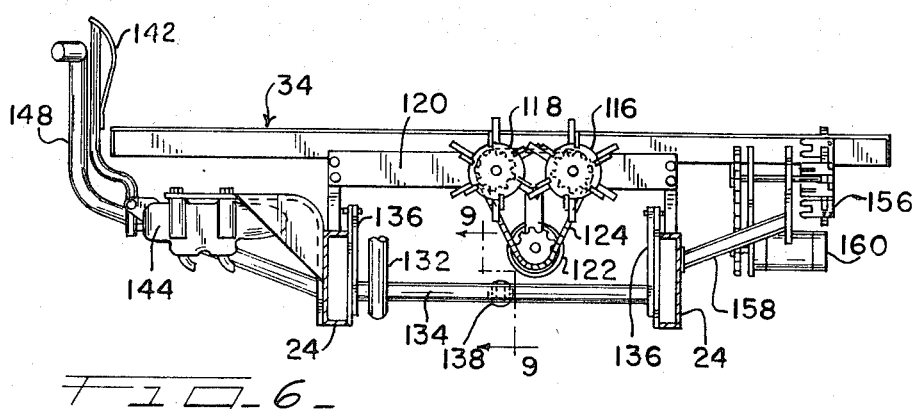
FIG_6_

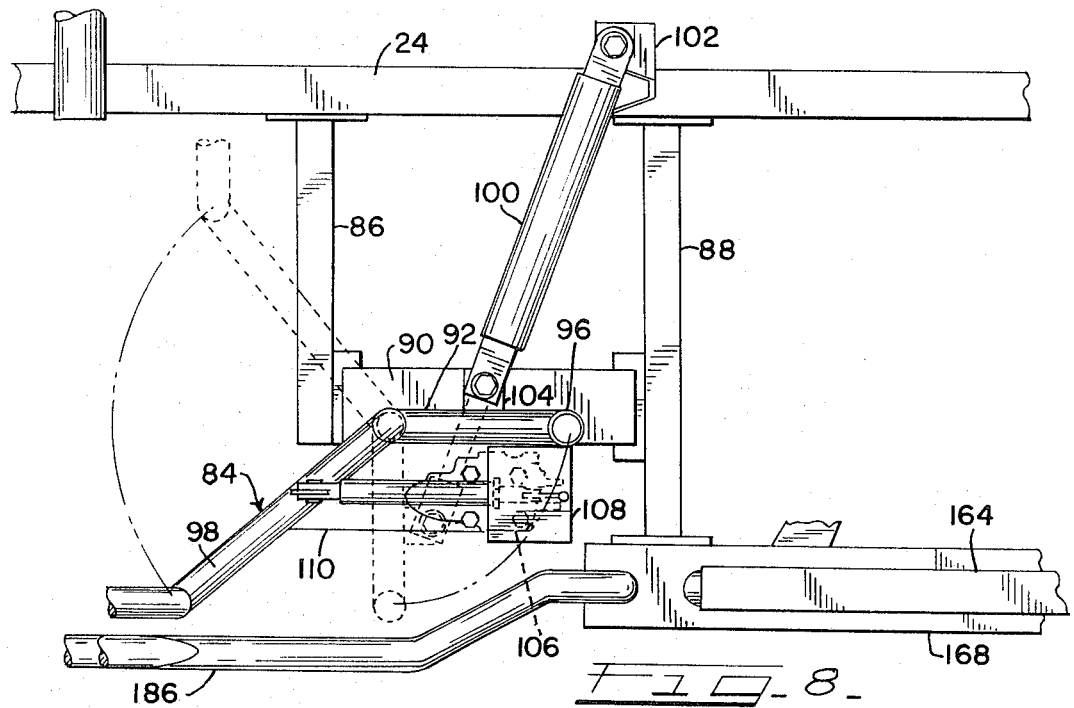
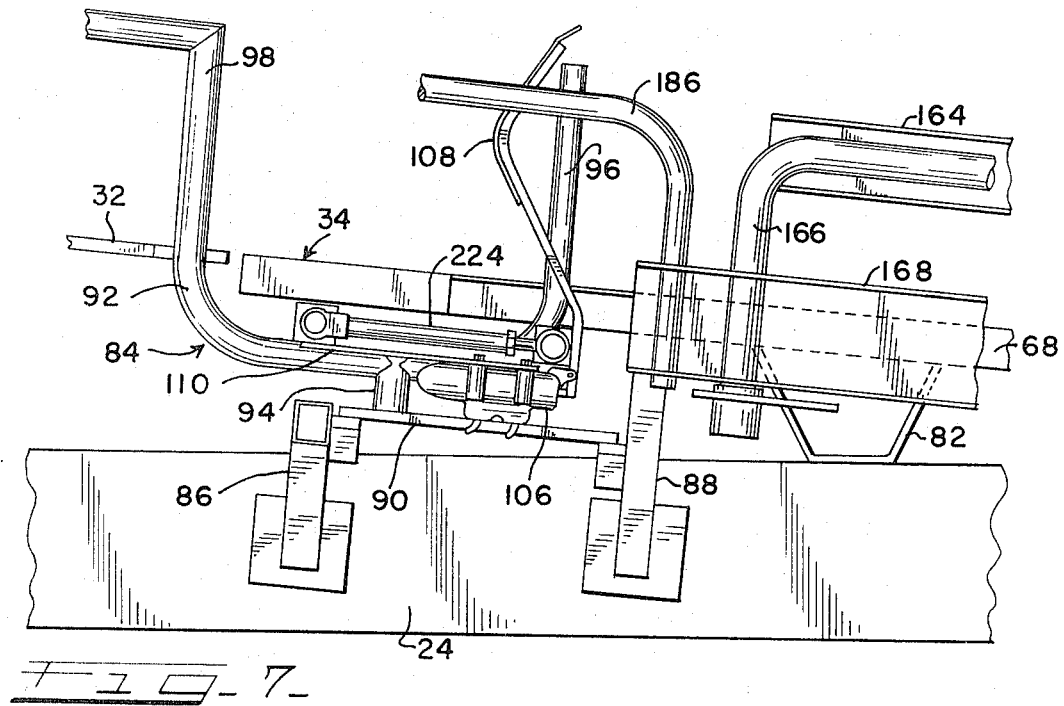

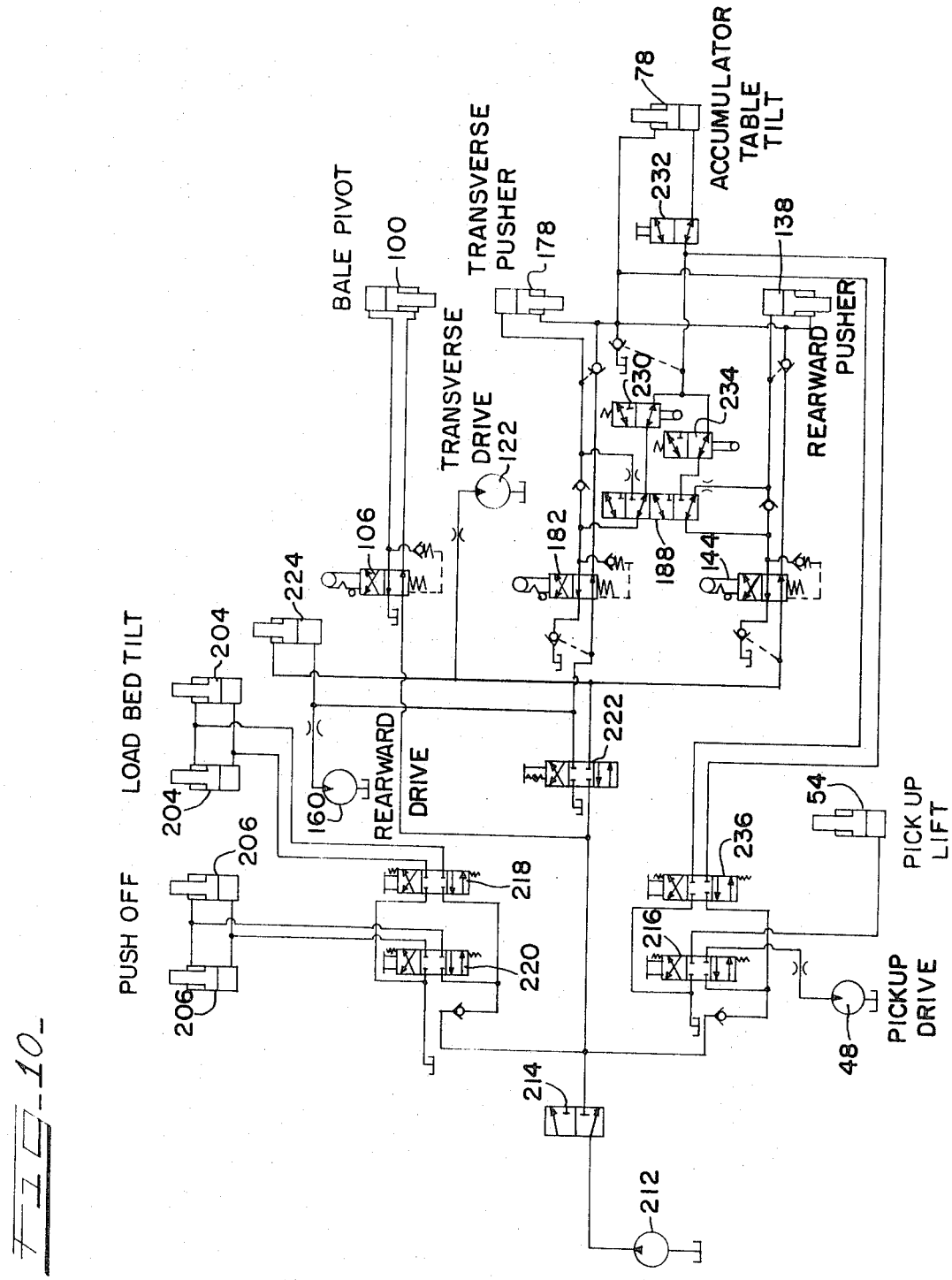

AUTOMATIC BALE HANDLING DEVICE

BACKGROUND OF THE INVENTION

The present invention relates generally to bale wagons and more specifically, to automatic bale wagons equipped with means for mechanically accumulating and stacking baled products such as hay.

In recent years there has been a concentrated effort to mechanize the operation of gathering and stacking baled hay. This activity has produced a wide assortment of automatic and semi-automatic equipment. Ideally, the automatic bale wagon mechanically accumulates bales in such a pattern so as to provide a stable stack of vertically disposed layers. In the semiautomatic variety of bale wagons, the stack is manually constructed in a particular pattern known as crosstying. Cross-tying describes a stack pattern wherein bales of vertically adjacent layers are disposed at angles relative to each other thereby binding the stack in a relatively stable unit. The basic problem is to design an effective bale stacking machine with the capability of automatically forming cross-tied bale layers of a bale stack.

SUMMARY

The general purpose of the present invention is to provide a bale wagon equipped with means for automatically accumulating bales in a cross-tied stack. The bale wagon constructed according to this invention includes an accumulator table and bale-handling mechanisms for selectively forming adjacent layers in distinct patterns. The patterns are such that when the layers are deposited on the load carrying bed and thence onto the ground, bales of one layer will be disposed crosswise of bales of adjacent layers resulting in a highly stable stack. It should be pointed out that stack stability not only provides for a self-sustaining stack, but expedites the operation of transferring the stack from the bale wagon onto the ground.

DESCRIPTION OF THE DRAWINGS

FIG. 4 is a plan view of the accumulator table illustrating accumulation of bales thereon in a pattern wherein the bales are disposed parallel to the vehicle chassis;

FIG. 5 is a plan view of the accumulator table illustrating the accumulation of bales thereon in a pattern wherein the bales are disposed transversely of the vehicle chassis;

FIG. 6 is a sectional view taken generally along the line 6—6 of FIG. 4;

FIG. 7 is an enlarged fragmentary side view of the front portion of the accumulator table and illustrating the bale pivot structure and operating mechanisms;

FIG. 8 is a fragmentary plan view of the bale pivot structure of FIG. 7;

FIG. 9 is an enlarged fragmentary sectional view taken generally in the direction of arrows 9—9 of FIG. 6 showing a bale pusher mechanism;

FIG. 10 is a schematic view illustrating the hydraulic control system of the bale wagon; and, FIG. 11 is a perspective view of a ground deposited stack accumulated by the bale wagon.

DESCRIPTION OF THE PREFERRED EMBODIMENT

Figure 1:
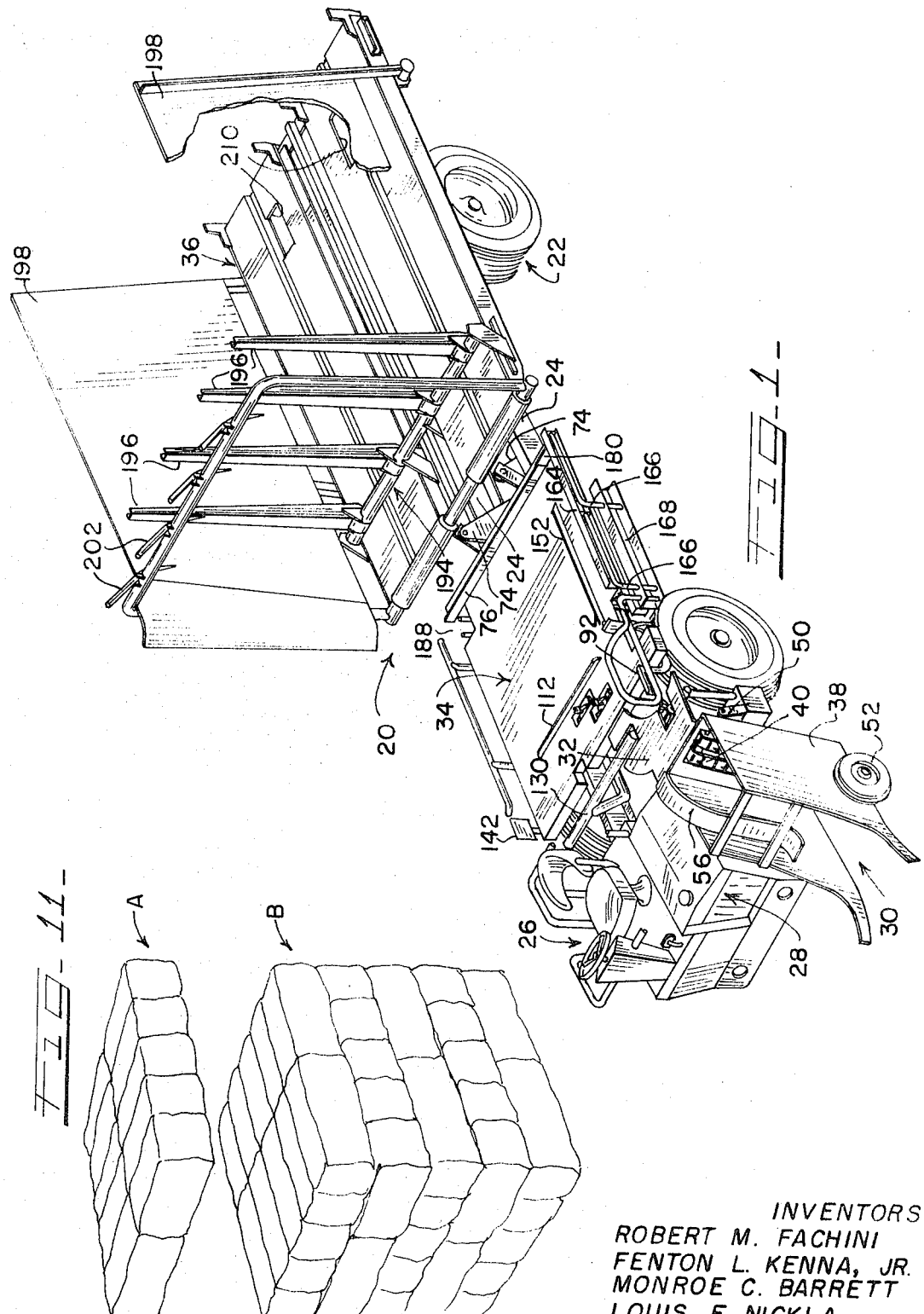
FIG. 1 is a perspective view of the bale wagon constructed according to this invention.

With reference to FIG. 1, a bale wagon 20 constructed according to this invention is seen to include a wheel mounted chassis 22 having a pair of longitudinal channel members 24,24 which support the components of the bale wagon. The components include the standard equipment such as the operator's station shown generally at 26 and an engine 28, and the bale-handling equipment which includes a bale pickup 30, a feeder platform 32, an accumulator table 34, and a load carrying bed 36.

Bale transfer means associated with the accumulator table 34 operate to accumulate bales on the table 34 into two distinct and separate patterns. The two patterns are shown in FIG. 11 with pattern A representing what will be referred to as the layer composed of transverse rows and pattern B representing the layer composed of longitudinal rows. It is the arrangement of the bales in pattern A in relation to the bales in pattern B which provides the cross-tied pattern described above.

The various components of the bale wagon 20 will be described under the following functional headings: Bale Pickup; Feeder Platform; Accumulator Table; Bale Transfer Assemblies; Load Carrying Bed; and Controls.

BALE PICKUP

Figure 2:
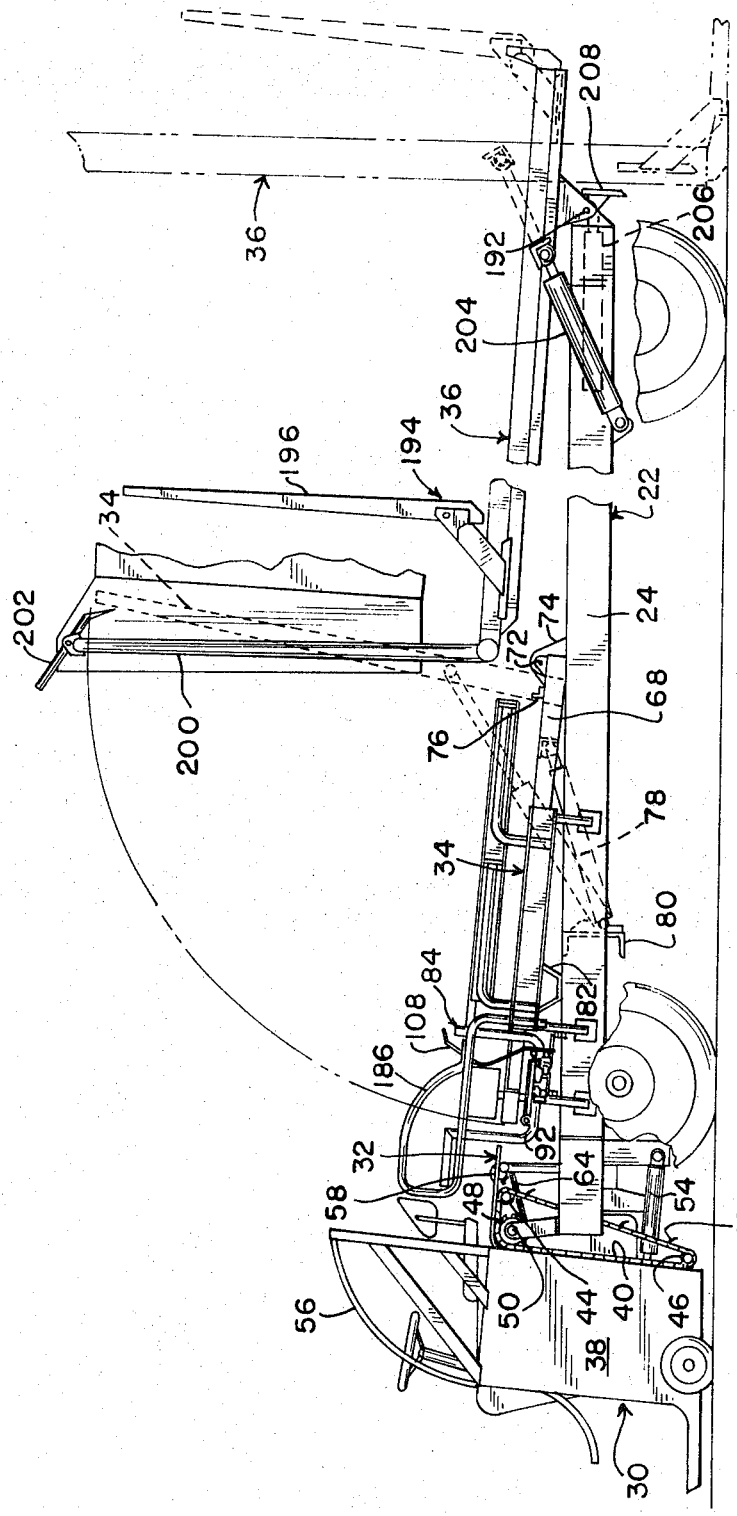
FIG. 2 is a side elevation of the bale wagon shown in FIG. 1.

As shown in FIGS. 1 and 2, the pickup 30 includes a generally U-shaped, forwardly opening framework 38 of a width for receiving bales lying on the ground. At least one endless conveyor chain 40 is disposed upwardly along the rear wall of the framework 38 for lifting bales upwardly by means of bale-engaging lugs 42 mounted in uniformly spaced relation on the chain 40. The chain 40 is trained about upper and lower sprockets 44 and 46 respectively and is driven by an intermediate hydraulic motor 48.

The bale pickup 30 is pivotally mounted to the chassis 22 for pivoting movement about a horizontal transverse axis at 50. A ground wheel 52 supports the pickup 30 in proper relation with the ground for picking up bales from the field during operation. A hydraulic cylinder unit 54 is pivotally connected between the chassis 22 and the pickup 30 for raising the pickup for transport. It will be understood that the sprockets 44 and 46 are mounted on the pickup 30 and that the motor 48 drives the chain 40 about an axis coincident with the transverse pivot axis 50. Accordingly, the drive system for the bale conveyor chain 40 is operative throughout any variations in the angular disposition of the pickup 30 about the axis 50. A bale guide 56 is mounted on the framework 38 in position to guide an incoming bale agsinst the chain 40 to insure lifting of the bale.

FEEDER PLATFORM

The feeder platform 32 is mounted on the chassis 22 between the pickup 30 and the accumulator table 34 to provide a surface across which bales are moved onto the accumulator table. A rotary conveyor wheel 58 is mounted on the platform 32 and includes a plurality of radially extending bale engaging lugs 60. A slot 62 (FIG. 3) is defined in the platform 32 and the wheel 58 is positioned so that the uppermost lugs 60 project through the slot 62 above the surface of the platform. The wheel 58 is adapted to be driven by the motor 48 through an endless chain 64. Accordingly, the bales picked up by the pickup 30 are moved by the wheel 58 rearwardly onto the accumulator table 34. The conveyor wheel 58 may be constructed in accordance with the details shown in U.S. Pat. No. 3,529,712.

ACCUMULATOR TABLE

Figure 3:
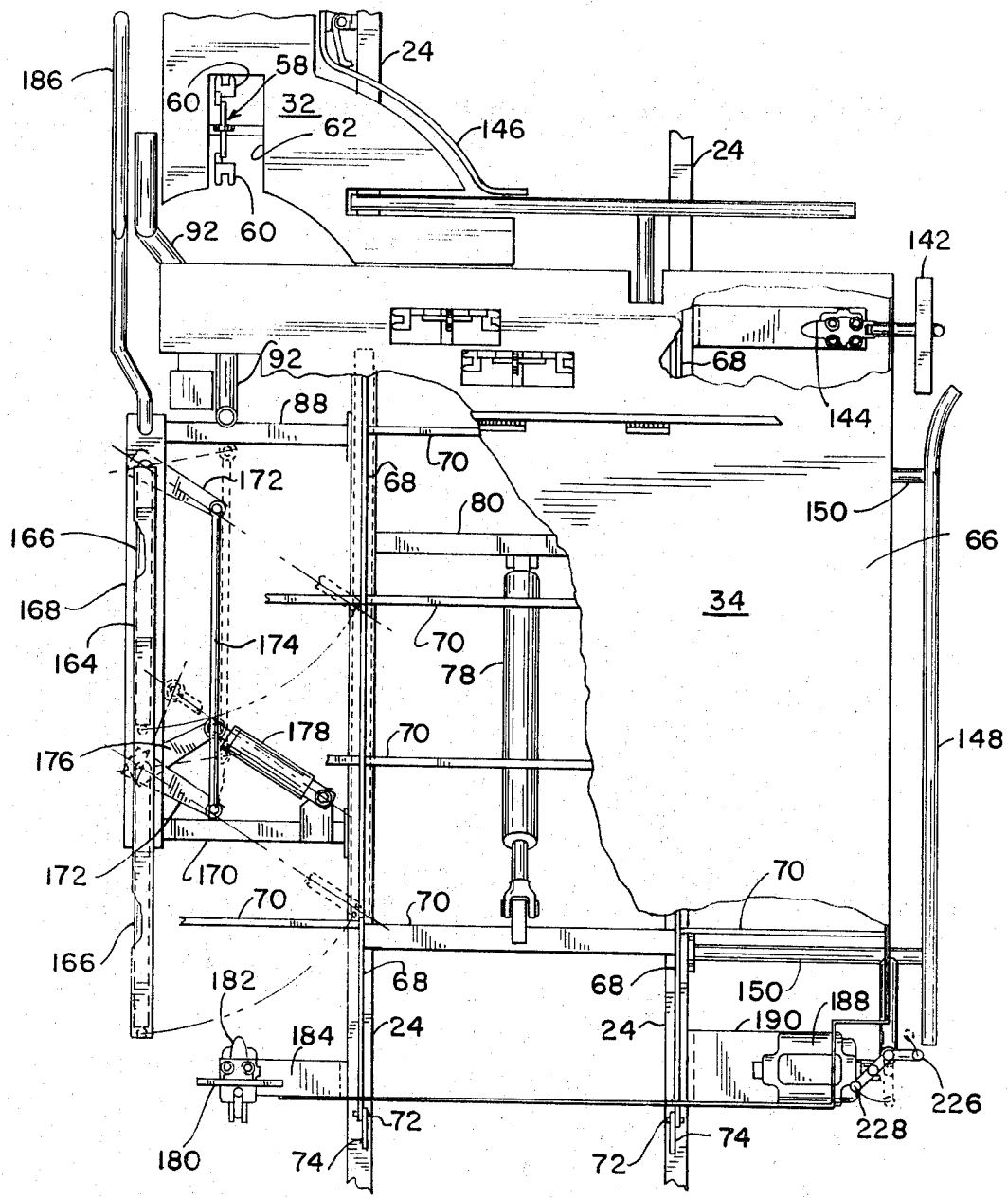
FIG. 3 is a plan view of the accumulator table shown in FIGS. 1 and 2 with portions cut away for convenience of illustration.

As best shown in FIG. 3, the accumulator table 34 includes a generally rectangular sheet metal plate 66 supported on a framework including longitudinal members 68 and cross members 70. The members 68 are disposed above the pair of chassis frame members 24 and are pivotally connected by pins 72 to upright plates 74 mounted on the frame members 24. An angle member 76 is mounted along the rear transverse margin of the sheet metal plate 66 to serve as an abutment for bales on the table.

A hydraulic cylinder unit 78 is pivotally connected between a cross brace 80 of the chassis and a cross member 70 of the table 34. Extension of the unit 78 causes the table to pivot upwardly about the axis defined by the connector pins 72 for depositing a tier of bales onto the forward margin of the load bed 36. As shown in FIGS. 2 and 7, a shoe 82 is mounted beneath each longitudinal member 68 for engagement on the top surface of the respective chassis frame members 24 when the table 34 is in its down or home position. It will be seen that the table 34 is tilted slightly rearwardly in this position to facilitate handling of bales thereon.

BALE TRANSFER ASSEMBLIES

The bale wagon of the invention includes means for selectively forming a layer of bales on the table 34 in either pattern A (transverse rows) or pattern B (longitudinal rows). The structure operative to form a layer in accordance with pattern A will first be described.

As shown generally in FIG. 2, and more specifically in FIGS. 7 and 8, a bale pivot assembly 84 is mounted on the chassis framework near a forward corner of the accumulator table 34 and rearwardly of the feeder platform 32. The function of the bale pivot assembly 84 is to receive a bale being delivered in a longitudinal attitude from the platform 32 and rotate or swing the bale through an angle of 90° to dispose the bale transversely on the table 34.

The structure for supporting the pivot assembly 84 is best shown in FIGS. 7 and 8. A pair of braces 86 and 88 extend transversely from the chassis frame member 24 in spaced relation. A bracket 90 is secured between the braces 86 and 88 to form a rigid framework therewith beneath the table 34.

A pivot arm 92 includes a vertical tube portion 94 journaled on the bracket 90. The arm 92 includes a rearwardly disposed and upwardly extending bale stop portion 96 and an upwardly and obliquely disposed bale swing portion 98. The arm portions 96 and 98 extend above the surfaces of the platform 32 and the table 34 for operative engagement with an end and a side respectively of a bale for pivoting the same.

The means for pivoting the arm 92 includes a hydraulic cylinder unit 100 (FIG. 8) pivotally connected at one end to a bracket 102 on the chassis frame member 24. The piston end of the unit 100 is pivotally connected to a bracket 104 secured to the arm 92. As shown in FIG. 8, extension of the unit 100 pivots the arm 92 from its solid line bale receiving position to the dotted line position wherein a bale has been pivoted 90°.

Actuation of the unit 100 is controlled by a flow control valve 106 which is, in turn, actuated by a trip lever 108. The valve 106 is mounted on a plate 110 secured to the arm 92. The trip lever 108 is pivotally connected to the valve 106 and projects upwardly adjacent to the arm portion 96 so as to be engageable by a bale received from the feeder platform 32. Thus, an incoming bale moves the lever 108 rearwardly to shift the spool of the valve 106 to extend the cylinder unit 100.

As shown in FIG. 5, an elongated guide plate 112 is mounted on the surface of the table 34 and extends transversely thereof. The plate 112 and the front edge of the table 34 define an elongated generally rectangular transversely extending row forming zone. The plate 112 is connected to the table 34 by spring biased hinges 114 which normally hold the plate in an upright position, but permit the plate to be pivoted rearwardly in response to a force exerted thereagainst sufficient to overcome the force of the springs.

A pair of offset conveyor wheels 116 and 118 are disposed beneath the table 34 in the transverse row forming zone for conveying bales transversely in the zone after the bales have been pivoted by the arm 92.

As shown in FIG. 6, the conveyor wheels 116 and 118 are journaled on a support 120 connected between the chassis frame members 24. A rotary type hydraulic motor 122 is suspended from the support 120 for driving the conveyor wheels by means of an endless chain 124.

The conveyor wheels 116 and 118 are of the same construction as the conveyor wheel 58, the details of which being shown and described in the abovementioned patent. The upper peripheries of the conveyor wheels project through openings 126 and 128 (FIG. 5) defined through the table 34 so as to engage the underside of a bale to move the same.

It will be seen in FIG. 5 that the conveyor wheels 116 and 118 are positioned to engage a bale as received from the pivot arm 92 and drive the bale toward the end of the transverse row forming zone. As a second bale is pivoted onto the bed 34 by the arm 92, it is driven into engagement with the preceding bale to thus form a transverse two-bale row.

In order to form a complete layer of transverse rows on the table 34, means are provided for successively pushing each row of bales rearwardly on the table. As shown generally in FIGS. 1 and 5, and more specifically in FIG. 9, a pusher bar 130 is operative adjacent to the forward end of the table 34 for pushing a two-bale row rearwardly from the transverse row-forming zone to clear the zone for a successive row. The pusher bar 130 is mounted on an arm 132 which is secured on a rockshaft 134. The rockshaft 134 is connected between a pair of links 136 pivotally connected to the pair of chassis frame members 24. A hydraulic cylinder unit 138 is pivotally connected between a cross brace 140 of the chassis and the rockshaft 134. Extension of the cylinder unit 138 is operative to swing the pusher bar 130 between a retracted position shown in solid lines in FIGS. 5 and 9 and an extended position shown in dotted lines.

The pusher bar 130 is actuated in response to the formation of a two-bale row on the transverse zone. A trip lever 142 is pivotally mounted on a flow control valve 144 which is connected to the chassis frame member 24 as shown in FIG. 6. The valve 144 is operatively associated with the cylinder unit 138 for controlling its extension and retraction. The trip lever 142 projects above the table 34 in position to be pivoted in response to engagement by the rightmost bale of the row as shown in FIG. 5. Pivoting of the lever 142 shifts the spool of the valve 144 to thus cause extension of the cylinder unit 138.

As best shown in FIG. 3, the bale wagon includes suitable structure for guiding the bales during pivoting across the platform 32 and during movement along the table 34. An arcuate guide member 146 is mounted adjacent to the platform 32 so as to define a guide way for the forward end of the bale as the same is being pivoted by the arm 92. A guide rail 148 is disposed longitudinally along the rightmost edge of the table 34. The guide rail 148 is supported by a pair of L-shaped support bars 150 extending downwardly and laterally inwardly beneath the table 34 for connection with the rightmost chassis frame member 24.

The structure for forming a layer of bales on the table 34 in accordance with pattern B (longitudinal rows) will now be described. As best shown in FIG. 4, an elongated guide plate 152 is mounted on the surface of the table 34 and extends longitudinally thereof. The plate 152 is disposed in spaced parallel relation to the leftmost edge of the table so as to define therewith an elongated, generally rectangular, longitudinally extending, row-forming zone. The plate 152 is connected to the table 34 by spring biased hinges 154 which normally hold the plate in an upright position, but permit the plate to be pivoted about the hinges 154 in response to a force exerted thereagainst sufficient to overcome the force of the springs.

A conveyor wheel 156, similar in construction to the above-described conveyor wheels 58, 116, and 118, is disposed beneath the table 34 for conveying bales toward the rear of the longitudinal row forming zone as the bales are received from the conveyor wheel 58. As shown in FIG. 6, the conveyor wheel 156 is journaled on a framework 158 connected to the chassis frame member 24. The conveyor wheel 156 is adapted to be driven by a rotary type hydraulic motor 160 mounted on the framework 158. The upper periphery of the conveyor wheel 156 projects above the surface of the table 34 through a slot 162 defined therethrough as shown in FIG. 4 so as to engage the underside of a bale and convey the same.

Upon the formation of a two-bale row in the longitudinal zone, means are actuated for pushing the row transversely out of the zone to clear it for the reception of a succeeding row and thus form a complete layer on the table. An elongated pusher plate 164 of channel shape is disposed along the edge of the table 34 at a level above the surface of the table so as to be engageable with a row of bales in the longitudinal zone. The pusher plate 164 is pivotally mounted on a pair of L-shaped arms 166 which are, in turn, pivotally mounted on a support beam 168. As best shown in FIG. 3, the beam 168 is supported from the chassis frame member 24 by the brace 88 and a rearwardly spaced support 170.

The pusher plate 164 is shiftable from a position flanking the edge of the table 34 to a position laterally displaced over the table as shown in solid lines and dotted lines respectively in FIG. 4. The mechanism for shifting the pusher plate 164 is shown in FIG. 3. A pair of levers 172 is secured to the lower ends of the arms 166 respectively and extend in parallel relation laterally inwardly beneath the table 34. A link 174 is pivotally connected to the ends of the levers 172 as shown. A lever 176 is secured to the rearmost lever 172 and provides a pivot connection with the piston portion of a hydraulic cylinder unit 178. The cylinder portion of the unit 178 is pivotally coupled to the support 170 as shown. It will be seen that extension of the unit 178 moves the above-described mechanism to shift the pusher plate 164 across the longitudinal row forming zone.

The shifting of the pusher plate 164 is actuated in response to the engagement by the end of the first bale of a two-bale row against a trip lever 180 disposed at the rear of the table 34. The trip lever 180 is pivotally mounted on a flow control valve 182 (FIG. 3) mounted on a plate 184 secured to the chassis frame member 24. The valve 182 is operatively associated with the hydraulic cylinder unit 178. Thus, as the lever 180 is pivoted, the control spool of the valve 182 is shifted to direct pressure fluid to the cylinder unit 178 which is thereby extended.

As shown in FIGS. 2 and 4, a rail structure 186 is mounted on the forward end of the beam 168 and extends forwardly along the edge of the table 34 and platform 32. The rail structure 186 serves as a guide for bales being conveyed rearwardly by the conveyor wheel 58 and prevents the bales from falling onto the ground as the bale wagon is operated over rough ground.

Upon formation of a complete layer of bales on the table 34 in either pattern A or pattern B, means are provided for actuating the hydraulic cylinder unit 78 to raise the table 34 to the dotted line position of FIG. 2 to deposit the layer onto the load bed 36 in the form of a vertical tier. As shown in FIG. 3, a valve 188 is mounted on a plate 190 extending laterally from the chassis frame member 24. As will be subsequently described in greater detail, the valve 188 is operatively associated with the cylinder unit 78 for controlling its extension and retraction.

LOAD CARRYING BED

As shown in FIGS. 1 and 2, the load carrying bed 36 is of the type known in the art wherein vertical tiers of bales are successively received on the forward portion of the bed until a full stack of bales is accumulated. The bed 36 is pivotally mounted on the chassis 22 at 192 for pivotal movement between a generally horizontal position and a generally vertical position shown in solid lines and dotted lines respectively in FIG. 2. When in the horizontal position, the bed 36 is disposed to receive vertical tiers of bales at the forward portion thereof.

A carriage structure 194 is rollably mounted on the bed 36 for movement rearwardly along the bed against the force of spring means (not shown). The carriage structure 194 includes a plurality of upwardly extending tines 196 which support a vertical tier of bales deposited thereagainst by the table 34. The carriage structure 194 is moved rearwardly as the second and succeeding tiers of bales are delivered onto the bed 36.

In order to support a stack of bales on the bed 36, a pair of side boards 198,198 flank the bed 36. An inverted U-shaped frame 200 is mounted on the forward portion of the bed 36 and includes a plurality of bale retainers 202. The retainers 202 engage the top bales of each tier successively positioned on the forward end of the bed 36 to stabilize each tier and the completed stack of bales. A pair of double-acting hydraulic piston cylinder units 204 (one being shown in FIG. 2) is connected between the chassis 22 and load bed 36 for pivoting the bed between its horizontal and vertical positions. A pair of double-acting hydraulic piston cylinder units 206 is mounted on the chassis 22 and each includes a plate 208 on the piston rod thereof. When the bed 36 is in the vertical position the units 206 may be extended to move the respective plates 208 through openings 210 (FIG. 1) defined in the bed 36. Accordingly, a stack of bales may be pushed from the tines 196 onto the ground.

CONTROLS

The hydraulic system for controlling the operation of the bale-handling mechanism of the wagon is shown schematically in FIG. 10. A hydraulic pump 212 is adapted to be driven by the engine 28 of the bale wagon. The pump 212 preferably has a capacity of 20 gallons per minute and a delivery pressure of 1800 psi. Pressure fluid is delivered by the pump 212 to a main control valve 214 by which the operator may actuate the hydraulic system. A manual control valve 216 includes two positions for actuating the pickup lift cylinder 54 and bale pickup drive motor 48 respectively. The load bed tilt cylinders 204,204 and the load push-off cylinders 206,206 are operated by manual control valves 218 and 220 respectively. It will, of course, be seen that each of the valves 216, 218 and 220 is a manually operated, spring-centered, three position, four-way flow control valve.

The system includes a manual selector valve 222 having two operative positions for the automatic accumulation of bales on the table 34 in pattern A (transverse bales) and pattern B (longitudinal bales) respectively. With the valve 222 shifted so that its lower envelope is in communication with the pump, pressure fluid is delivered to the motor 122 to drive the bale drive wheels 116 and 118 (FIG. 6). Pressure fluid is also delivered through the valve 106 to retract the cylinder 100 and thus swing the bale pivot assembly 84 into its bale receiving position. It will also be seen, with reference to FIG. 10, that valve 106 and 144 are related to the cylinders 100 and 138 respectively such that shifting of the valves from the illustrated positions will cause extension of the respective cylinders. With reference to FIGS. 7 and 8 when an incoming bale moves the trip lever 108 rearwardly, the valve 106 is shifted to extend the cylinder 100 to thus swing the bale pivot assembly 90° to deposit the bale transversely on the table 34. With reference to FIGS. 6 and 9, when a bale moves the trip lever 142, the valve 144 is shifted to extend the cylinder 138 to thus swing the pusher bar 130 to its dotted line position.

With the selector valve 222 shifted so that its upper envelope is in communication with the pump, pressure fluid is delivered to the rotary motor 160 to drive the bale drive wheel 156 (FIGS. 4 and 6). Pressure fluid is also delivered to a cylinder 224 (FIG. 7) mounted on the bale pivot assembly 84 having its piston rod connected to the trip lever 108. As the cylinder 224 is extended, the trip lever 108 shifts the valve 106 to thus extend the cylinder 100. Accordingly, the bale pivot assembly 84 is swung 90° to the dotted line position of FIG. 8. In this position the assembly 84 is by-passed by incoming bales being moved rearwardly by the wheels 58 and 156 (FIG. 4) because the elements 96 and 98 (FIG. 7) are spaced apart more than the width of a bale. It will be seen with reference to FIG. 10 that the valve 182 (FIG. 3) is related to the cylinder 178 such that shifting the valve 182 from its illustrated position will cause extension of the cylinder 178 when selector valve 188 is shifted to its alternate position described below. With reference to FIGS. 3 and 4, when a bale moves the trip lever 180 rearwardly, the valve 182 is shifted to extend the cylinder 178. Accordingly, the pusher plate 164 is moved laterally across the table 34 to the dotted line position shown in FIG. 4.

The hydraulic control system includes means for automatically pivoting the table 34 upwardly in response to accumulating a complete layer of bales on the table in either pattern A or pattern B. As shown in FIG. 3, the selector valve 188 is adapted to be shifted between two operative positions by an actuator having upwardly extending arms 226 and 228. It will be seen that a transverse bale being moved rearwardly on the table 34 will engage the arm 226 and pivot the actuator from the dotted line position to the solid line position and thus shift the valve 188. A longitudinal bale being moved transversely across the table will engage the arm 228 to pivot the actuator to the dotted line position and thus shift the valve 188 to its other operative position.

With reference to FIG. 10, the selector valve 188 is operatively associated with the valves 144 and 182 in a manner to permit either the valve 144 or the valve 182 to control the extension of the table lift cylinder 78 depending upon which bale pattern is being accumulated. With the valve 188 in the illustrated position and with the valve 222 shifted to direct pressure fluid to the valve 182, it will be seen that shifting the valve 182 from its illustrated position will direct pressure fluid through the valve 188. From there pressure fluid passes through a lock valve 230 and a manual lock valve 232 into the table lift cylinder 78 to extend the same and lift the table 34.

With the selector valve 188 shifted out of its illustrated position and with the selector valve 222 shifted to direct pressure fluid to the valve 144, it will be seen that shifting the valve 144 from its illustrated position will direct pressure fluid through the valve 188. From there pressure fluid passes through a lock valve 234, through the manual lock valve 232 and into the cylinder 78 to raise the table 34.

The tabel lift cylinder 78 is retracted to lower the table 34 due to the fact that each of the valves 144 and 182 is pilot-operated from line pressure to shift back to its illustrated position wherein pressure fluid is directed into the opposite end of the cylinder 78.

The above mentioned lock valves 230 and 234 are mechanically interconnected by means (not shown) with the pusher cylinders 178 and 138 respectively. In the event that either or both of the bale pushers 164 and 130 are extended above the surface of the table 34, the mechanical interconnection with the respective valves 230 and 234 shifts these valves to block the flow of pressure fluid to the table lift cylinder 78. Consequently, the table 34 cannot be raised and damage to the table and bale pushers is precluded.

The above mentioned lock valve 232 is manually operable to block flow to the lift cylinder 78 when, for example, it is desired to inspect or repair the table 34 when in a raised or partially raised position.

The control system also includes a manually operable control valve 236 by which flow to the table lift cylinder 78 may be controlled to raise or lower the table when desired.

OPERATION

In operation the bale wagon is driven forwardly so that the bale pickup 30 is aligned with the longitudinal extent of bales on the ground. The main control valve 214 is opened and the valve 216 is shifted to drive the motor 48 and also, if required, to lift the pickup by means of the cylinder 54. As best shown in FIG. 2, the motor 48 drives the bale lift chain 40 and the bale drive wheel 58 so that a bale is lifted from the ground and moved rearwardly over the feeder platform 32. With the control system set to accumulate bales on the table 34 in transverse rows (FIG. 5), the incoming bale is driven against the bale pivot trip lever 108 and the pivot assembly 84 turns the bale 90° and onto the bale drive wheels 116 and 118 which move the bale along the guide plate 112. The second bale is received and turned in the same manner and drives the first bale against the trip lever 142. This actuates the pressure bar 130 which pushes the two-bale row rearwardly over the spring-biased guide plate 112. As two-bale rows are accumulated in this manner, the first bale will eventually be moved against the arm 226 to shift the valve 188 to a position wherein the first bale of the last row deposited on the table will move the lever 142. This shifts the valve 144 and pressure fluid extends the cylinder 78 to raise the table to the dotted line position of FIG. 2 to deliver the layer of bales as a vertical tier against the carriage structure 194. The accumulation and deposit of tiers of bales on the load bed may be continued in the above described manner.

After the deposit of any tier onto the load bed 36, the operator may shift the selector valve 222 so that bales are accumulated in longitudinal rows as in FIG. 4. As explained above, the bale pivot assembly 84 will be pivoted to the position wherein incoming bales bypass the assembly 84 and are moved rearwardly by the wheels 58 and 156 along the guide plate 152. The second bale pushes the first bale against the trip lever 180. This actuates the pusher plate 164 and the two-bale row is moved across the guide plate 152 and out of the row forming zone. As subsequent two-bale rows are received and accumulated, the first bale will eventually be moved against the arm 228 to shift the valve 188 to a position wherein the first bale of the last row deposited on the table will move the trip lever 180. This shifts the valve 182 and pressure fluid extends the cylinder 78 to raise the table and deposit the layer of bales as a vertical tier on the load bed 36.

After a full stack of bales has been completed on the bed 36, the stack may be deposited as a unit onto the ground. The valve 218 is actuated to extend the cylinders 204,204 and the bed 36 is raised to the vertical position shown in dotted lines in FIG. 2. The valve 220 is then actuated and the cylinders 206,206 extend to push the stack of bales rearwardly from the tines 196.

The valves 220 and 218 are then actuated to retract the cylinders 206 and 204 so that the load bed 36 will be returned to its original home position.

What is claimed is:

1. An apparatus for accumulating a plurality of rectangular bales, said apparatus comprising:

a table;

means for delivering individual bales to said table, said table having a portion disposed for receiving said bales from said delivery means in a first attitude;

first bale transfer means for moving bales received on said table along said table in said first attitude;

second bale transfer means for turning bales received on said table substantially 90° relative thereto about an axis normal to the plane of said table to a second attitude, the bales in said second attitude having their longitudinal axes perpendicular to the longitudinal axes of bales in said first attitude;

and third bale transfer means for moving bales in said second attitude along said table, said first, second, and third transfer means being selectively operable so that bales may be accumulated on said table in either the first attitude or the second attitude;

said first bale transfer means including first means for forming a row of bales disposed in said first attitude and second means for moving said row laterally so that a plurality of rows may be accumulated on said table in said first attitude;

and said third bale transfer means including third means for forming a row of bales disposed in said second attitude, and fourth means for moving said row of bales disposed in said second attitude laterally thereof so that a plurality of said rows may be accumulated on said table in said second attitude.

2. The invention as recited in claim 1, wherein said second bale transfer means includes an arm assembly pivotable about said axis to apply force to a bale disposed in said first attitude on said receiving portion to effect pivotal movement of said bale thereby turning it to said second attitude substantially 90° angularly displaced from said first attitude.

3. The invention as recited in claim 1, wherein said receiving portion is disposed at the forward end of said table, said delivery means adapted to deliver and said receiving portion adapted to receive bales in said first attitude wherein the longitudinal axis of said bale extends generally rearwardly of said table;

said first means includes a conveyor operative upon individual bales on said receiving portion in said first attitude to move said bales rearwardly along said table away from said receiving portion to form a fore and aft extending row on said table, and said second means includes a pusher engageable with a longitudinal side of said fore and aft extending row to move said row laterally along said table;

and said third means including a conveyor operative upon individual angularly displaced bales to form a row extending transversely of said table, and said fourth means including a pusher engageable with a longitudinal side of said transverse row for moving said row rearwardly along said table.

4. The invention as recited in claim 2, wherein said second bale transfer means includes means for pivoting said arm assembly about said axis between a first position for permitting bales to move therepast in said first attitude and a second position for receiving and turning bales to said second attitude.

5. An apparatus for accumulating a layer of bales comprising:
a table having first and second elongate row-forming portions disposed at substantially right angles to each other;
first bale tranfer means including means for depositing bales on said first row portion, means for accumulating a plurality of said deposited bales into a row on said first row portion, and means for accumulating on said table a plurality of rows formed on said first row portion;
and second bale transfer means including means for depositing bales on said second row portion, means for accumulating a plurality of said deposited bales into a row on said second row portion, and means for accumulating on said table a plurality of rows formed on said second row portion, said first and second bale transfer means being selectively operable whereby layers accumulated on said table may be composed of rows formed on one of said first and second row portions.

6. An apparatus for mechanically accumulating a plurality of rectangular bales, said apparatus comprising:
a four-sided table, said table having a bale-receiving portion, a first row-forming portion extending outwardly from said receiving portion adjacent one side of said table, and a second row-forming portion extending outwardly from said receiving portion in a direction perpendicular to that of said first row-forming portion;
means for singly delivering bales on said receiving portion;
first bale transfer means including means operative upon bales received on said receiving portion for moving bales to said first row portion with the longitudinal axis of said bales disposed parallel to that of said first row portion, means for forming a row on said first row portion, and means for moving said formed row along said table away from said first row portion whereby a plurality of rows may be accumulated on said table;
second bale transfer means including means operative upon bales received on said receiving portion for moving bales onto said second row portion with the longitudinal axes of said bales disposed parallel to that of said second row portion, means for forming a row on said second row portion, and means for moving said formed row along said table away from said second ror portion whereby a plurality of said rows may be accumulated on said table;
and means for selectively operating said first and second bale transfer means.

7. The invention as recited in claim 6, wherein said table includes means for receiving bales on said receiving portion in a first attitude, said bales in said first attitude having their longitudinal axes disposed parallel to said first row portion, and said means for moving said bales from said receiving portion to said second row portion including bale turning means for angularly displacing said bales substantially 90° so that said bales are deposited on said second row portion with their longitudinal axes substantially parallel to that of said second row portion.

8. The invention as recited in claim 7, wherein said row portions intersect, said intersection defining said receiving portion.

9. A bale wagon for mechanically accumulating bales of hay, comprising:
a longitudinally extending chassis;
a load carrying bed mounted on said chassis;
an accumulator table mounted on said chassis, said table having a first elongate portion extending longitudinally of said chassis, and a second elongate portion extending transversely of said chassis, said portions being rectangularly disposed;
a first bale transfer means including means for depositing bales on said first portion, means for arranging a plurality of bales deposited thereon into a row, and means for moving said row along said table transversely away from said first portion so that a plurality of longitudinally disposed rows may be accumulated side-by-side on said table;
and a second bale transfer means including means for depositing bales on said second portion, means for arranging a plurality of bales deposited thereon into a row on said second portion, and means for moving said row longitudinally along said table so that a plurality of transversely disposed rows may be accumulated on said table;
and means for transferring a layer accumulated on said table to said load carrying bed, said first and second bale transfer means being selectively operable so that adjacent layers may be formed of transverse rows and longitudinal rows on said load carrying bed.

10. The invention as recited in claim 9, wherein said first and second portions intersect, said intersection defining a bale receiving area on said table, said first bale transfer means including a bale elevator mounted on said chassis and operable to deposit a bale on said bale receiving area, and said arranging means of said first transfer means including conveyor means for moving a bale from said receiving area along said first portion, and said bale arranging means of said second transfer means including conveying means for moving a bale from said receiving area along said second portion.

11. The invention as recited in claim 10, wherein said elevator is positioned in advance of said table and operable for depositing a bale on said receiving portion with the longitudinal axis of said bale oriented substantially parallel to that of said first portion, said bale arranging means including bale turning means for pivoting said bale on said receiving area substantially 90° thereby depositing said bale on said second portion with the longitudinal axis thereof being substantially parallel to that of said second portion, and said conveying means being operable to move said turned bale along said second portion so that a plurality of bales may be accumulated on said second portion forming a transverse row of bales arranged in end-to-end relation on said table.

12. An apparatus for mechanically arranging a plurality of rectangular bales, said apparatus comprising:

a support;

a table mounted on said support and having first and second elongate row-forming zones disposed longitudinally and transversely thereof respectively;

first means for depositing a row of bales on said first portion;

first pusher means on said support sequentially operable to move a row of bales from said first zone transversely on said table in response to the successive formation of complete rows on said first zone whereby a plurality of longitudinal rows are formed into a layer on said table;

second means for depositing a row of bales on said second zone;

second pusher means on said support sequentially operable to move a row of bales from said second zone longitudinally on said table in response to the successive formation of complete rows on said second zone whereby a plurality of transverse rows are formed into a layer on said table;

and means for selectively actuating said first and second means and said first and second pusher means for forming the layers successively and independently on said table.

13. The subject matter of claim 12, including conveyor means for successively delivering bales onto said table in an attitude wherein the longitudinal axis of each bale is disposed parallel to said first zone, said second means including an arm assembly pivotally mounted on said support for turning bales received from said conveyor means through an angle of substantially 90° to align the bales with said second zone.

14. The subject matter of claim 13, wherein said arm assembly includes trip means operative in response to engagement by a bale received from said conveyor means for effective pivoting movement of the arm assembly.

* * * * *